Sept. 7, 1954    G. E. HOLTON    2,688,193
PINION SETTING GAUGE
Filed Dec. 11, 1952
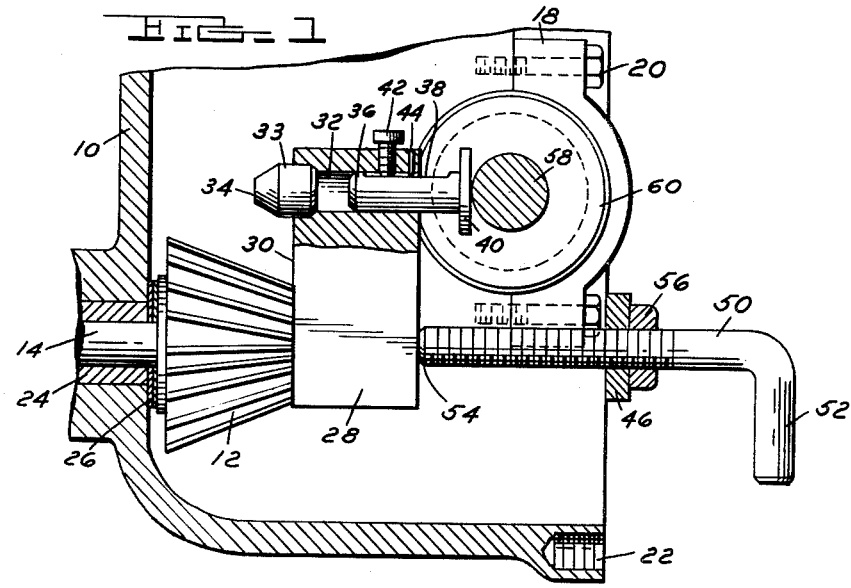
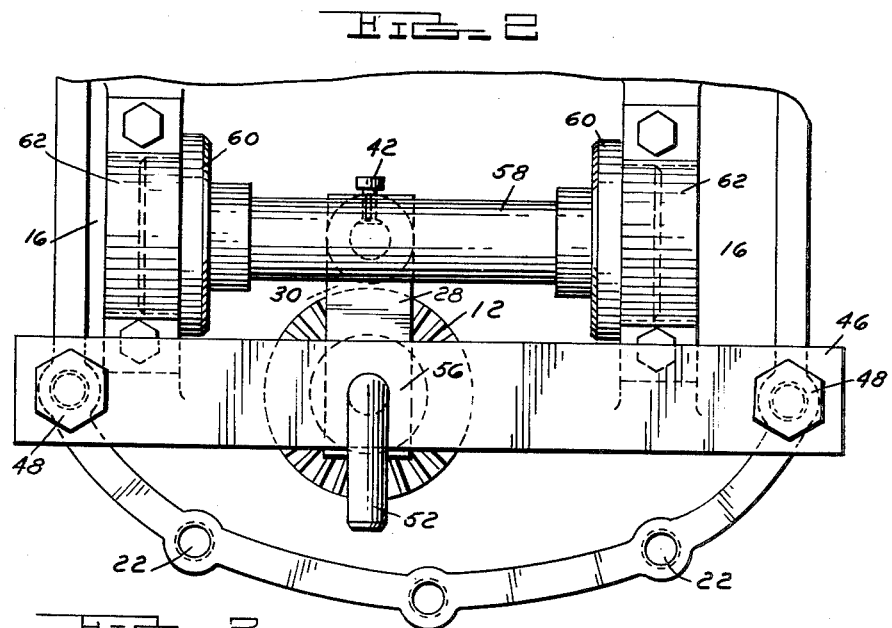
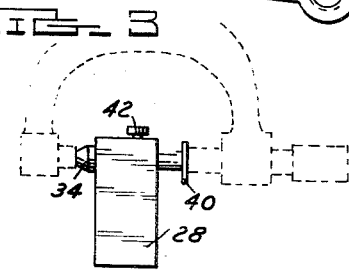
INVENTOR.
GEORGE E. HOLTON
BY
Burton & Parker
ATTORNEYS Patented Sept. 7, 1954

2,688,193

UNITED STATES PATENT OFFICE 2,688,193

PINION SETTING GAUGE

George E. Holton, Jackson, Mich., assignor to Kent-Moore Organization, Inc., Detroit, Mich., a corporation of Michigan Application December 11, 1952, Serial No. 325,405

8 Claims. (Cl. 33—181)

This invention relates to a device for measuring the cone distance of a pinion gear setting in a differential gear train.

In the assembly or adjustment of the pinion gear with respect to the ring gear in an automotive type differential, it is important that the gear teeth properly mesh. If the cone distance between these gears is accurately set then proper meshing obtains.

The cone distance between the pinion gear and the ring gear of a differential gear train may be defined as the nominal assembly dimension between the axis of the ring gear and the face of the axle drive pinion gear.

It is understood that the pinion ring and differential gear are mounted and enclosed within a housing forming a part of the axle of the vehicle. The pilot shaft from the engine enters the housing at one side of the ring gear through a bearing in the housing and a pinion gear is mounted on the propeller shaft adjacent the bearing and adapted to mesh with the ring gear. It is with this type of differential gear train that my invention is to be employed.

Many different types of differential gear trains are in use by the automobile industry. Measuring devices to determine the cone distance in each particular type of differential have become very desirable. Therefore, an object of this invention is to provide a measuring device adapted to measure the cone distance between the ring and pinion gears in an automotive type differential gear train of the character described.

Another object of this invention is the provision of a measuring block provided with a reciprocable plunger member which may be locked in determined adjusted position of reciprocation in the block.

A further object of this invention is the provision of a stub shaft exhibiting a pair of slidably mounted collars adapted to seat within the bearings of the differential housing normally supporting the ring and differential gears, and position the axis of the shaft on the axis of the ring gear.

A meritorious feature of the invention is a bracket adapted to be mounted on the differential housing and provided with a tightening screw adapted to abut and hold a measuring block against the face of the axle drive pinion gear.

A further meritorious feature of this invention is a method of measuring the cone distance between the ring and pinion gears in an automotive type differential gear train of the character herein described, which consists in removing the ring and differential gears, seating a stub shaft in the bearings formerly supporting the ring and differential gears, holding a measuring device of the character herein disclosed against the face of the drive pinion gear and adjusting a part of the device to abut the stub shaft, removing the device and measuring the cone distance as represented by the setting of the device.

Other objects, advantages and meritorious features will more fully appear from the following claims, specification and drawings wherein:

Fig. 1 is a partially broken away cross sectional view through a differential gear train housing showing my invention in place therein;

Fig. 2 is a partially broken away top view of a differential gear train housing showing my invention positioned therein; and Fig. 3 is a schematic view of the gauge block showing the position of a measuring instrument thereon when the block is being measured.

A differential gear train housing is represented by numeral 10 in the drawings. An axle drive pinion gear 12, mounted upon the end of the pilot shaft 14 from the engine, is adapted to normally mesh with a ring gear not shown. While the ring gear and differential gears are not shown in the drawings, it will be understood that they are normally supported on a pair of shafts (also not shown) which are mounted within bearings 16. Each bearing comprises a base formed in the housing and a cap 18 secured over the base by bolts 20. One end of the housing is open for access to the interior, but is adapted to be closed by a cover plate held thereover by bolts which thread into complementary recesses 22 formed in the edge of the housing.

A bearing 24 supports the pilot shaft within the housing, and shims 26 determine the axial adjustment of the pinion on the shaft. This axial adjustment of the pinion enables adjustment of the cone distance between the pinion and ring gears. By the addition or subtraction of shims 26, the cone distance may be correspondingly adjusted.

Whenever, for any reason, the setting of the cone distance is disturbed, as by the disassembly of the pinion ring, or differential gears, the cone distance must be accurately reset. Continued or prolonged use of the automotive vehicle will cause wear on the gear teeth or at the bearings and this will necessitate readjustment of the cone distance whenever any of these gears or bearings are replaced.

My invention is intended to be used to measure the cone distance in a differential gear train of the type generally represented by the drawings, both speedily and accurately. In the following discussion it is to be understood that the ring and pinion gears have been removed from the differential housing 10. To accomplish the objects of this invention, a generally rectangularly shaped gauge block 28 having a machined surface 30 is adapted to be seated against the end face of the pinion gear, as shown in Fig. 1. The block is interiorly cylindrically recessed adjacent one end, as at 32. This recess opens through opposite faces of the block and extends perpendicular to the ground face 30. Adjacent the ground face the recess is of a larger diameter, and a plug 33 is adapted to seat within such enlarged portion. The exterior end 34 of the plug is machined so as to lie in a plane parallel to the ground face 30 of the block.

A plunger 36, having a flatted portion 38 intermediate its length, is adapted to be slidably received within the recess. The rear end of the plunger is provided with a head 40. The diameter of the plunger is such that while it freely telescopes within the gauge block, substantially no lateral movement of the plunger is possible. A set screw 42 threadedly mounted in the top of the block is adapted to engage the flatted portion of the plunger and hold it in adjusted telescoped positions. A pin 44 is mounted in the top of the block adjacent the set screw and extends downwardly into the recess 32 but spaced just above the flatted portion of the plunger. The pin is adapted to abut the small shoulders at each end of the flatted portion of the plunger, and prevent the plunger from accidentally sliding out of the recess.

In order to hold the gauge block accurately seated against the face of the pinion, and to ensure that the pinion gear is firmly seated against the shims, an elongated bar 46 is adapted is be secured by bolts 48 over the open end of the housing. The bolts are threadedly received by opposed recesses 22. The bar is provided with a threaded hole through which is received a tightening screw 50 having a handle portion 52 and an end 54 adapted to abut and urge the block toward the pinion. A nut 56 is provided to lock the screw to the bar.

A disk or stub shaft 58, provided with two collars 60 is adapted to lie on the axis of the ring gear. Each collar 60 has a reduced diameter portion 62 of a diameter equal to the diameter of the shaft carrying the ring and differential gears. To position the disk shaft as shown in Fig. 2, the bearing caps 18 are removed from the housing, the shaft and collars are laid in the bearings, the caps replaced and the bolts tightened to grip the collars within the bearings. The same disk shaft may be used in differential housings having varying sizes of bearings by providing collars whose reduced diameter portions 62 correspond to the various bearing sizes.

Referring again to the plug 33, the amount by which the face 34 thereof is spaced above the ground face 30 of the gauge block is equal to the radius of the disk shaft. Therefore, it becomes apparent that the distance from the face 34 of the plug to the disk shaft is the equivalent of the distance from the axis of the disk shaft to the plane of the face of the pinion gear. The collars 60 align the disk shaft to lie on the axis of rotation of the ring gear, and so the above mentioned distance will represent the existing setting of the face of the pinion gear with respect to the axis of the ring gear.

To accomplish the measurement of the existing setting, with the gauge block in the position shown in Figs. 1 and 2, and with the tightening screw set up thereagainst, the plunger 38 is moved against the disk shaft, and while there held the set screw 42 is tightened. The tightening screw 50 is then backed off and the gauge block removed from the housing. By means of a micrometer gauge placed upon the gauge block, as shown in Fig. 3, the distance between the plane of the face of the pinion gear and the axis of the ring gear may be measured. Knowing what the accurate cone distance is supposed to be and comparing this with the measurement just obtained, shims 26 may be added or subtracted and the cone distance accurately set.

What I claim is:

1. A gauge for measuring the cone distance in a differential gear train when the pinion gear is in place and the ring and differential gears are removed comprising, in combination, a shaft mountable on the axis of the ring gear, a gauge block adapted to be accurately seated against the face of the pinion gear, an extensible member mounted on the block and movable to abut the shaft, and means mountable on the differential gear train housing and adapted to support the block upon the face of the pinion gear.

2. A gauge for measuring the cone distance in a differential gear train when the pinion gear is in place and the ring and differential gears are removed comprising, in combination, a shaft exhibiting a pair of collar members and mountable on the axis of the ring gear with the collars accurately seated in the bearings adapted to support the ring gear, a gauge block adapted to be accurately seated upon the face of the pinion gear, a plunger mounted on the block and extensible to abut the shaft, and means mountable in the differential gear train housing and adapted to support the block upon the face of the pinion gear.

3. A gauge for measuring the cone distance in a differential gear train when the pinion gear is in place and the ring and differential gears are removed comprising, in combination, a shaft mountable on the axis of the ring gear, a gauge block having an accurately ground flat face which is adapted to abut the end of the pinion gear, a plunger reciprocally mounted on the block and extensible to abut the shaft, means for locking the plunger in adjusted positions of reciprocation, and means mountable on the differential gear train housing and adapted to support the block upon the end of the pinion gear.

4. A gauge for measuring the cone distance in a differential gear train when the pinion gear is in place and the ring and differential gears are removed comprising, in combination, a shaft mountable on the axis of the ring gear, a gauge block having an accurately ground flat face which is adapted to abut the end of the pinion gear, a noselike part upstanding from said ground face a distance equal to the radius of the shaft, a plunger reciprocally mounted on the block and operable through the side opposite the noselike part to abut the shaft, means for locking the plunger in adjusted positions of reciprocation, and means mounted on the differential gear train housing and adapted to support the block upon the end of the pinion gear.

5. A gauge for measuring the cone distance in a differential gear train when the pinion gear is in place and the ring and differential gears are removed comprising, in combination, a shaft mountable on the axis of the ring gear, a gauge block adapted to be accurately seated against the face of the pinion gear, an extensible member mounted on the block and movable to abut the shaft, a bracket mountable upon the differential gear train housing, and a threaded rod received through said bracket and movable toward and away from said pinion gear and adapted to abut and urge said block against the end of the pinion gear.

6. A gauge for measuring the cone distance in a differential gear train when the pinion gear is in place and the ring and differential gears are removed comprising, in combination, a shaft mountable on the operative axis of the ring gear, a pair of complementary collars slidably mounted upon the shaft and seatable within the bearings normally supporting the ring gear to position the shaft in the aforementioned position, a gauge block having an accurately ground flat face which is adapted to abut the end of the pinion gear, a plunger reciprocally mounted on the block and extensible to abut the shaft, said plunger shaped intermediate the opposite ends to define a flatted portion, means mounted upon the block and adapted to engage said flatted portion to lock the plunger in adjusted positions of reciprocation, and means mountable upon the differential gear train housing and adapted to support the block upon the end of the pinion gear.

7. A gauge for measuring the cone distance in a differential gear train when the pinion gear is in place and the ring and differential gears are removed comprising, in combination, a shaft mountable on the operative axis of the ring gear, a pair of complementary collars slidably mounted upon the shaft and seatable within the bearings normally supporting the ring gear to position the shaft in the aforementioned position, a gauge block having an accurately ground flat face which is adapted to abut the end of the pinion gear, a noselike part upstanding from said ground face a distance equal to the radius of the shaft, a plunger reciprocally mounted in the block and operable through the side opposite the noselike part on a line perpendicular to said ground face and intersecting the noselike part, said plunger shaped intermediate the opposite ends to define a flatted portion the ends of which terminate in opposed shoulders, a pin threadedly mounted on the block and adapted to abut said flatted portion to lock the plunger in adjusted positions of reciprocation, means mounted on said block and extending toward said flatted portion but spaced thereabove adapted to abut said shoulders and limit the reciprocable movement of the plunger, and means mounted on the differential gear train housing adapted to support the block upon the end of the pinion gear.

8. A gauge for measuring the cone distance in a differential gear train when the pinion gear is in place and the ring and differential gears are removed comprising, in combination, a shaft mountable on the operative axis of the ring gear, a pair of complementary collars slidably mounted upon the shaft and seatable within the bearings normally supporting the ring gear to position the shaft in the aforementioned position, a gauge block having an accurately ground flat face which is adapted to abut the end of the pinion gear, a noselike part upstanding from said ground face a distance equal to the radius of the shaft, a plunger reciprocally mounted on the block and operable through the side opposite the noselike part on a line perpendicular to said ground face and intersecting the noselike part, a bracket mountable upon the differential gear train housing, and a threaded rod received through said bracket and movable toward and away from said pinion gear and adapted to abut and urge said block against the end of the pinion gear.

References Cited in the file of this patent

UNITED STATES PATENTS

| Number | Name | Date |
|---|---|---|
| 883,869 | Fortin | Apr. 7, 1908 |
| 1,839,596 | Rouse | Jan. 5, 1932 |
| 2,145,841 | Walters | Jan. 31, 1939 |
| 2,627,120 | Hotchkiss | Feb. 3, 1953 |